Patented Feb. 27, 1940

2,192,153

UNITED STATES PATENT OFFICE 2,192,153

AZO DYESTUFFS

Hans Roos, Leverkusen-I. G.-Werk, Rhine, Germany, assignor to General Aniline & Film Corporation, a corporation of Delaware No Drawing. Application September 1, 1938, Serial No. 227,969. In Germany September 8, 1937

4 Claims. (Cl. 260—159)

The present invention relates to new azo dyestuffs and to a method of preparing the same. More particularly it relates to substantive technically very valuable azo dyestuffs of the general formula:

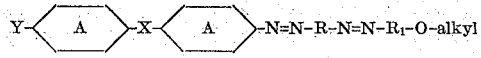

In this formula X stands for a C—C—linkage (diphenyl linkage) or for the —CH=CH—bridge; R and $R_1$ are benzene nuclei which may be substituted at most by a methyl group, Y stands for hydrogen or any substituent as for instance alkyl, halogen, $SO_3H$, the nitro group, the acylamino group or amino group and the residue —N=N—R, R being the radical of a coupling component and at least one of the nuclei designated A contains a sulfonic acid group.

My new dyestuffs are obtained by coupling diazotized sulfonic acids, e. g. of 4-aminodiphenyl, 4-acylamino- or 4-nitro-4'-aminodiphenyl or of 4-acylamino- or 4-nitro-4'-aminostilbene with aniline or also toluidine in the usual manner, further diazotizing, coupling with a phenol and alkylating the OH-group of the phenol in the usual manner. The dyestuffs thus obtained dye cotton orange to brown shades which in general are distinguished by a good fastness to light and a good dischargeability. If the starting components contain a nitro or an acylamino group these groups may be converted into free amino groups by reduction or saponification. The aminodisazo dyestuffs thus obtained as well as the nitro or acylamino dyestuffs from which they have been prepared are as such of technical importance; these dyestuffs can be further diazotized in substance or, after the dyeing, on the fiber and coupled with any coupling component for azo dyestuffs. If these coupling components are properly chosen the good dischargeability previously present can be retained. As coupling components may be mentioned, for example, salicyclic acid, pyrazolones, resorcinol or its monoazo dyestuffs which may contain also metal, naphthol sulfonic acids, aminonaphthol sulfonic acids and the derivatives thereof as well as their monoazo dyestuffs as far as they are capable of coupling a second time, and many others. In order to obtain dyestuffs which contain in the initial component an acylamino group it is often useful to carry out the acylation only in the dyestuffs; thus this acylation can be carried through also e. g. in the above mentioned aminodisazo dyestuffs. Chiefly benzoylation, treatment with phosgene and cyanuric chloride are best carried out in this stage.

The following examples illustrate the invention, without, however, restricting it thereto, the parts being by weight.

Example 1

38.6 parts of monoacetyl-benzidine-3.3'-disulfonic acid are diazotized with sodium nitrite and hydrochloric acid in the usual manner and combined with 11 parts of m-toluidine in acetic solution. The separated monoazodyestuff is further diazotized with a slight excess of sodium nitrite and hydrochloric acid and then coupled with 9 parts of phenol in sodium carbonate alkaline medium. The separated dyestuff which is sensitive to alkali is alkylated with methyl chloride in a 50% alcoholic solution at 90–100° C. in the usual manner. The dyestuff dyes cotton yellow-orange shades and the dyeings are distinguished by a very good fastness to light and a good dischargeability both in neutral and alkaline medium. It corresponds in the free state to the following formula:

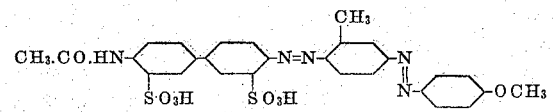

If this dyestuff is saponified by heating it for one hour in a dilute sodium hydroxide solution to 90° C. a product is obtained of similar tinctorial properties as the unsaponified dyestuff, dyeing cotton somewhat redder orange shades:

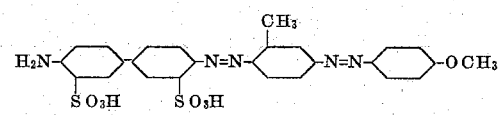

In contradistinction to the unsaponified dyestuff this dyestuff can be diazotized on the fiber and developed, e. g. with β-naphthol to bordeaux and with pyrazolone to red orange shades.

Example 2

58.5 parts of the dyestuff described at the end of Example 1 are dissolved in water and diazotized with 7 parts of sodium nitrite and hydrochloric acid, while stirring, for some time. The diazo compound, which is dissolved to a large extent, is run into a neutral solution of 21 parts of 1-phenyl-5-pyrazolone-3-carboxylic acid, the hydrochloric acid being neutralized by the addition of sodium acetate. The dyestuff obtained dyes cotton clear orange shades of good dischargeability and fastness to light. It corresponds in the free state to the following formula:

stuff is done away with by alkylation with methyl chloride at 90° C.

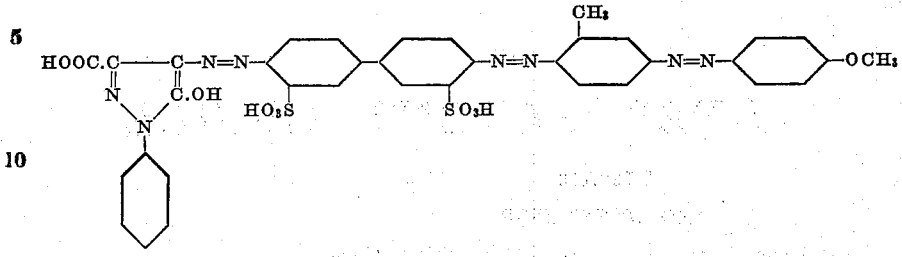

If, in this example, as coupling component, 23 parts of 1-(3'-amino)-phenyl-5-pyrazolone-3-carboxylic acid are used, a dyestuff is obtained which dyes cotton the same shade. The dyeing can be further diazotized on the fiber and developed with β-naphthol or pyrazolone to an orange of good fastness to light and good dischargeability. Also by aftertreatment with diazotized p-nitroaniline on the fiber an orange brown of good fastness to washing is obtained which is likewise distinguished by a good fastness to light and good dischargeability.

If in this example instead of the pyrazolones 2-amino-8-hydroxynaphthalene-6-sulfonic acid is used as coupling component a full brown is obtained which can be deepened by further diazotizing and coupling with m-phenylene diamine in substance or on the fiber.

Bluish brown shades are obtained by employing as coupling component (coupling to be carried out in alkaline medium) the monoazo dyestuff prepared by coupling diazotized o-chloranilinesulfonic acid with 2-amino-5-hydroxynapthalene-7-sulfonic acid or with 2-amino-8-hydroxynaphthalene-6-sulfonic acid in acid medium.

A very yellowish brown is obtained if the copper compound of o-aminophenol sulfonic acid-azoresorcinol is used as coupling component.

The number of possible couplings is very large.

Example 3

40 parts of 4-nitro-4'-aminostilbene-2.2'-disulfonic acid are diazotized with 7 parts of sodium nitrite and hydrochloric acid in the usual manner and run into a hydrochloric solution of 11 parts of m-toluidine. By gradually adding sodium acetate the coupling become complete and the monoazo dyestuff is isolated. It is diazotized with sodium nitrite and hydrochloric acid in the usual manner. The diazo compound is filtered off and coupled with phenol in sodium carbonate alkaline solution. The sensitiveness to alkali of this dye- The dyestuff thus obtained corresponds in the free state to the following formula.

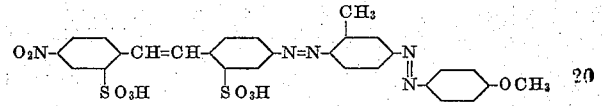

and dyes cotton very clear orange shades; it is distinguished by a good fastness to light and a good dischargeability both in alkaline and neutral medium.

A very similar dyestuff is obtained by starting from 4-aminostilbene-2.2'-disulfonic acid instead from 4-nitro-4'-aminostilbene-2.2'-disulfonic acid.

By reducing the nitro-dyestuff with sodium sulfide at 60° C. a dyestuff is obtained which dyes cotton brown shades, also of good dischargeability and which can be diazotized on the fiber and developed.

By treating the reduced dyestuff with acetic anhydride and sodium hydroxide solution (Schotten-Baumann) in the cold a dyestuff of the following constitution:

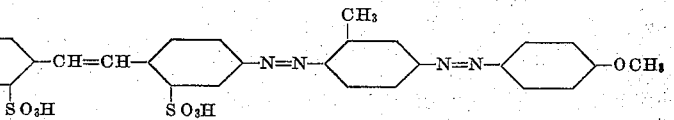

is obtained, which dyes cotton clear orange shades fast to light and well dischargeable. A very similar product is obtained if instead of acetic anhydride benzoyl chloride is used for the acylation. The dyestuff thus obtained is distinguished by a somewhat improved fastness to water.

By treating the above described aminodisazo dyestuff with p-nitrobenzoylchloride at 70° C. and reducing the separated condensation product with sodium sulfide a dyestuff is obtained which corresponds in the free state to the following formula:

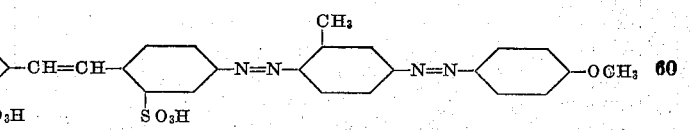

and which likewise dyes cotton orange shades. The dyeing can be developed on the fiber, e. g. with β-naphthol to a red orange of good fastness to light, very good fastness to washing and good dischargeability.

Example 4

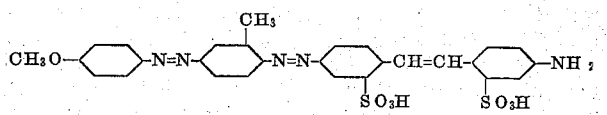

60.1 parts of the dyestuff prepared according to Example 3 which corresponds to the above formula are diazotized in exactly the same manner as the dyestuff of Example 2 and also coupled in the same manner with different coupling components. Thus dyestuffs are obtained of similar properties, but dyeing different shades, e. g. with 1-phenyl-5-pyrazolone-3-carboxylic acid a well dischargeable scarlet is obtained. Also with 1-(3'-aminophenyl)-5-pyrazolone-3-carboxylic acid scarlet shades are obtained which become fast to washing by aftertreatment with β-naphthol or pyrazolone or also diazotized p-nitraniline.

Also with 2-amino-8-hydroxynaphthalene-6-sulfonic acid, 2-amino-5-hydroxynaphthalene-7-sulphonic acid always redder shades are obtained with this dyestuff than with the dyestuff of Example 2, however, their properties are very similar.

Quite similar dyestuffs are obtained if in all examples instead of m-toluidine aniline-ω-methane-sulfonic acid or also the ω-methane-acid the o-toluidine compound is employed for the first coupling. After eliminating the methane-acid residue by saponification one proceeds in the manner described in the examples.

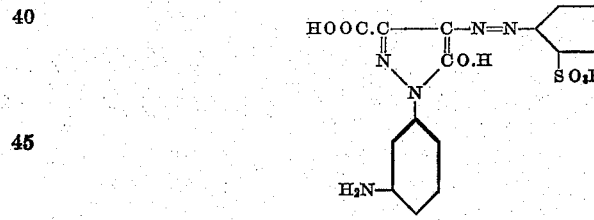

If in the preceding examples instead of phenol o- or m-cresol is used for the final coupling, dyestuffs are obtained which practically do not differ from the corresponding dyestuffs containing phenol.

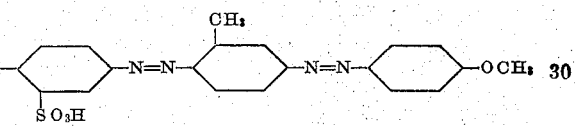

I claim:

1. As new products azo dyestuffs of the general formula:

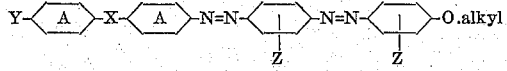

wherein X stands for one of the group consisting of the diphenyl linkage (—) and the —CH=CH— bridge, Y stands for one of the group consisting of hydrogen, alkyl, halogen, the sulfonic acid group, the nitro group, the acyl-amino group, the azo-pyrazolone group and the amino group capable of being diazotized and of coupling, Z stands for one of the group consisting of hydrogen and methyl and at least one of the nuclei designated A contains a sulfonic acid group.

2. As new products azo dyestuffs of the general formula:

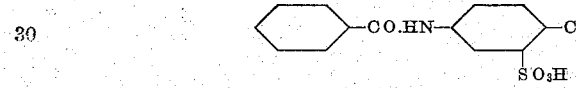

wherein X stands for one of the group consisting of the diphenyl linkage (—) and the —CH=CH— bridge, Y stands for one of the group consisting of hydrogen, alkyl, halogen, the sulfonic acid group, the nitro group, the acyl amino group, the azo-pyrazolone group and the amino group capable of being diazotized and of coupling and Z stands for one of the group consisting of hydrogen and methyl.

3. As new product the azo dyestuff corresponding in its free state to the formula:

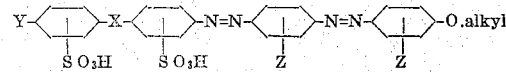

dyeing cotton clear orange shades of good fastness to light and good dischargeability.

4. As new product the azo dyestuff corresponding in its free state to the formula:

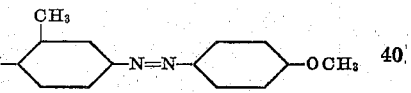

dyeing cotton clear orange shades of good fastness to light and good dischargeability, changing to orange brown shades of good fastness to light and washing and of good dischargeability when aftertreated on the fiber with diazotized p-nitraniline.

HANS ROOS.